United States Patent [19]

Hatzikelis et al.

[11] Patent Number: 4,493,806
[45] Date of Patent: Jan. 15, 1985

[54] RECYCLING OF CONTAMINATED PLASTIC

[76] Inventors: Christopher Hatzikelis, R.R. #1, Palgrave, Ontario, Canada; Ciro Madonia, 1390 Beaufort Dr., Burlington, Ontario, Canada; Cesare C. Cosentino, 45 Grandview Ave., Thornhill, Ontario, Canada

[21] Appl. No.: 268,385

[22] Filed: May 29, 1981

[51] Int. Cl.³ .................... B02C 19/00; B02C 23/00; B29B 3/00
[52] U.S. Cl. ....................... 264/28; 241/23; 264/102; 264/140; 264/DIG. 69
[58] Field of Search .................. 264/28, 37, 140, 102, 264/DIG. 69; 241/23

[56] References Cited

U.S. PATENT DOCUMENTS

| 3,976,730 | 8/1976 | Cushing | 264/37 |
| 4,000,232 | 12/1976 | Klaeysen et al. | 264/37 X |
| 4,021,280 | 5/1977 | Rinde et al. | 264/28 X |
| 4,098,463 | 7/1978 | Lowry | 241/23 X |
| 4,102,503 | 7/1978 | Meinass | 241/23 X |
| 4,124,997 | 11/1978 | Sadjina et al. | 241/23 X |
| 4,273,294 | 6/1981 | Hollely et al. | 241/23 X |
| 4,304,873 | 12/1981 | Klein | 241/23 X |

OTHER PUBLICATIONS

Fisher, E. G., *Extrusion of Plastics*, New York, Interscience Publishers, ©1958, pp. 80 and 81.
Flathers, N. T., R. E. Johnson, V. R. Pallas and W. Mayo Smith, "Advances in Dry Blend Extrusion" in *Modern Plastics*, May 1961, pp. 210, 212, 219, 220, and 346.

*Primary Examiner*—Philip Anderson

[57] ABSTRACT

A process is provided for recycling contaminated plastic to achieve a product having improved softness and enchanced stability. The process includes the step of chilling the material being recycled to an embrittlement temperature and pulverizing the chilled material to a finely divided consistency. The process is suitable for use in recycling polyvinyl chloride (PVC) having a range of acceptable contaminants such as laminations, adhesives, coatings including a polyester film of Mylar (polyethylene teraphthalate) in plain or metalized form, which would normally require physical removal of the contaminants to prevent contamination of the reprocessed plastic, that usually results in a black material of very limited utility. In practicing the improved process the contaminants are dispersed through the pulverized material resulting in plastic which may be influenced by color and upon re-use, as by pelletizing or melting and extruding by way of a screw feeder, results in a naturally foaming material having closed cell foam characteristics which provide a good finish, improved softness and stability against shrinkage, enhanced resistance to delamination, and no retained "memory".

5 Claims, 3 Drawing Figures

RECYCLING OF CONTAMINATED PLASTIC

BACKGROUND OF THE INVENTION

This invention is directed to a method for recycling contaminated plastic, and to improved plastic formulations provided thereby.

In industries using plastic material for particular products the creation of scrap product, is inevitable. In the case of product incorporating components such as laminations, adhesives coatings such as polyester film, Mylan in plain or metallized form, reclamation of such scrap has previously required the physical removal of the contaminating components, before remelting the scrap.

Failure to remove the contaminants results upon melt down of the material in a black coloured product not normally suitable for use except in block form.

It has been found that such contaminated plastic can be recycled to an effective product having unexpectedly advantageous characteristics without the need of mechanical or other manner of removal of the contaminating elements.

The method involves the step of chilling the contaminated plastic material to an embrittlement temperature, and pulverising the chilled material to a finely divided consistency. It has been found that chilling of the plastic to a temperature in the range of $-150°$ F. to $-200°$ F. followed by pulverisation to a powder results in a material suited for re-use, and possessing the following unexpected characteristics;

(a) the powdered material may be pelletised, or
  (b) heated and extruded through a desired die, or
  (c) the plastic is susceptible to influence by colour;
  (d) the resulting extruded material is a closed-cell spontaneously foamed material capable of providing a good surface finish and having a density 20 to 40% less than the untreated contaminated starter material, while possessing enhanced softness, dimensional stability, and improved resistance to delamination (i.e. improved adhesiveness).
  (e) the process has unexpected benefit that the treated material retains no residual memory.

The process generally is practiced by carrying out an initial grinding step to reduce the material to a more readily processed product.

DESCRIPTION OF THE DRAWINGS

Referring to FIG. 1, this illustrates two forms of contaminated scrap, which is suitable for reclaimation by the subject process. The scrap 10 comprises a laminated car trim having an extruded main section 12, of material such as PVC, having an adhesive layer 16 and protective Mylan tape 18 laminated to the section 12. The Mylan tape 18 might well be metallised on its inner surface by a vapour desposited layer of aluminum of a few mils thickness.

Figure 1:
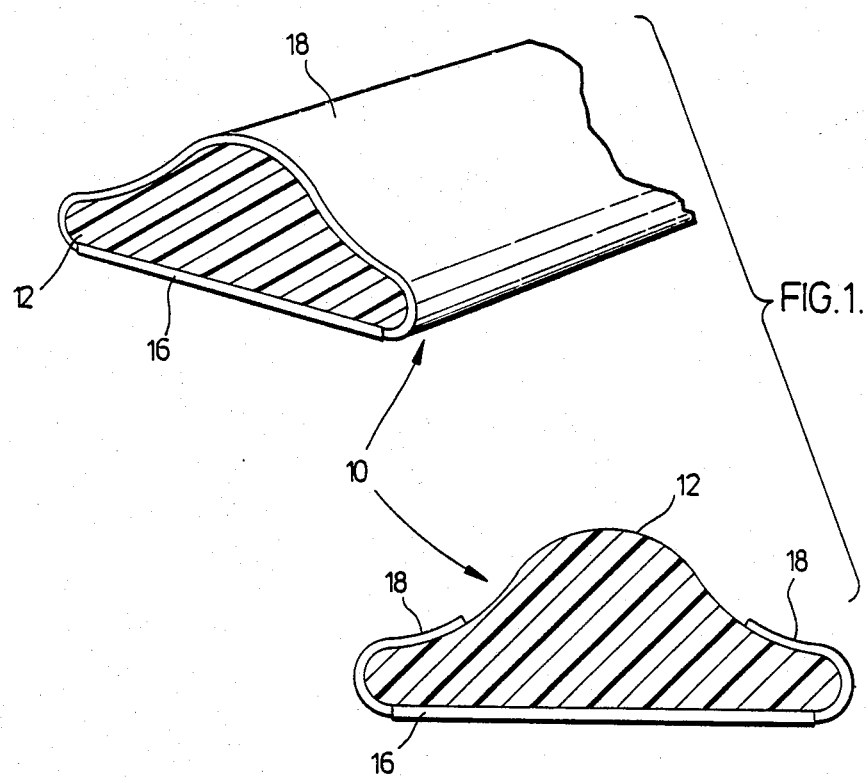
FIG. 1 shows typical pieces of trim scrap.
Figure 2:
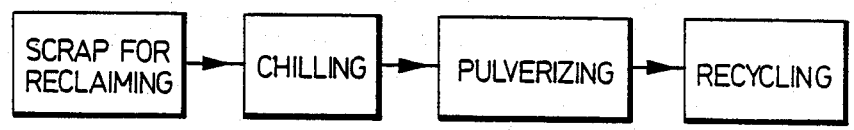
FIG. 2 shows a schematic flow chart for the basic process.
Figure 3:
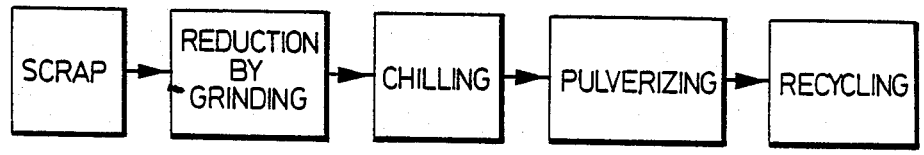
FIG. 3 is a like schematic for a process incorporating preliminary size reduction by grinding.

Before pulverisation, the scrap is chilled to an embrittlement temperature in the range of $-150°$ F. to $-200°$ F., and then pulverised to powder form. To facilitate handling of the scrap it can be initailly mechaniclly reduced by cutting or grinding prior to chilling.

What I claim by Letters Patent in the United States is:

1. The method of recycling polyvinyl chloride plastic formed material having in intimate adherent relation therewith a layer of polyester film said film normally having the property as a contaminant of causing undue discolouration of said polyvinyl chloride upon the melting thereof, comprising the step of chilling the material to a temperature in the range of minus $150°$ F. to minus $200°$ F. to severely embrittle the material, mechanically pulverizing the chilled material to a powder form having said contaminant dispersed therewith to provide a reclaimed colourable material, and forming said reclaimed material into a desired shape.

2. The method as claimed in claim 1, wherein said formed plastic material is mechanically reduced to a suitable size prior to said chilling step.

3. The method as claimed in claim 1, said forming step comprising heating and extruding said reclaimed pulverized material through a die of desired section.

4. The method as claimed in claim 1 including a step of adding a predetermined amount of selected coulour pigment material to the recycled material.

5. The method as set forth in claim 1, said adherent polyester film having a metalized layer thereon.

* * * * *